United States Patent

[11] 3,589,797

| [72] | Inventors | Stewart E. Miller<br>Locust;<br>William H. Steier, Middletown, both of, N.J. |
|---|---|---|
| [21] | Appl. No. | 752,811 |
| [22] | Filed | Aug. 15, 1968 |
| [45] | Patented | June 29, 1971 |
| [73] | Assignee | Bell Telephone Laboratories, Incorporated<br>Murray Hill, Berkeley Heights, N.J. |

[54] GAS LENS FOR OPTICAL TRANSMISSION, WITH VERTICAL GRADIENT HEATING TO REDUCE ABERRATIONS
11 Claims, 6 Drawing Figs.

| [52] | U.S. Cl. | 350/179 |
|---|---|---|
| [51] | Int. Cl. | G02b 3/12,<br>G02b 5/14 |
| [50] | Field of Search | 350/175,<br>179, 180, 96 WG |

[56] References Cited
UNITED STATES PATENTS

| 3,403,956 | 10/1968 | Miller | 350/179 |
|---|---|---|---|
| 3,442,574 | 5/1969 | Marcatili | 350/179 |

OTHER REFERENCES
"Deformation of Gas Lenses by Gravity," D. Gloge, THE BELL SYSTEM TECHNICAL JOURNAL, Vol. XLVI, No. 2, February 1967, Pgs. 357— 365
"Measurements On A Thermal Gradient Gas Lens," William H. Steier, IEEE TRANSACTIONS ON MICROWAVE THEORY AND TECHNIQUES, Vol. MTT-13, No. 6 pgs. 740— 748.

*Primary Examiner*—John K. Corbin
*Attorneys*—R. J. Guenther and Arthur J. Torsiglieri ABSTRACT: A gas lens having a radial refractive index gradient in a horizontal conduit suffers from an optical aberration due to the fact that the vertical centers of gravity of different vertical chords of gas are displaced downward due to gravity by different amounts, depending upon the horizontal distance of the chords from the center of the conduit. This aberration is minimized by the provision of means for angular gradient heating at a plurality of locations along a lower portion and/or upper portion of the conduit, thereby inducing an upward convection force in the gas to oppose the aforementioned varying gravity-induced downward displacement of the gas.

PATENTED JUN 29 1971  3,589,797

INVENTORS S. E. MILLER
W. H. STEIER
BY *D. Kaplan*
ATTORNEY

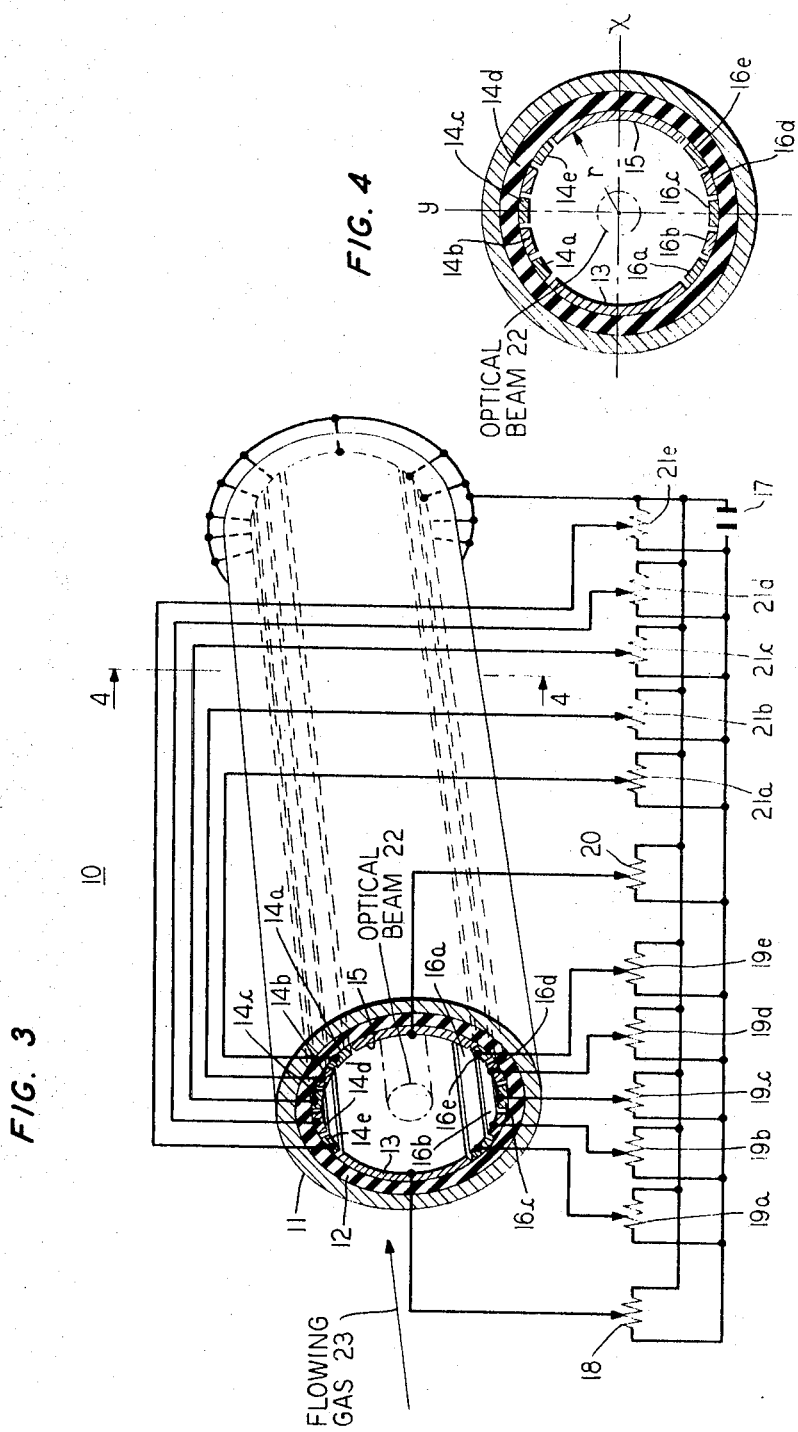

PATENTED JUN29 1971

3,589,797

SHEET 3 OF 3

GAS LENS FOR OPTICAL TRANSMISSION, WITH VERTICAL GRADIENT HEATING TO REDUCE ABERRATIONS

This invention relates to gas lenses, for the transmission of optical beams of radiation in conduits; in particular, to means for minimizing the distortions or aberrations therein.

In the transmission of an optical beam in the central portion of a pipeline or conduit over long distances, of the order of many miles for example, it is desirable to have optical focusing means distributed in the conduit itself in order to prevent the beam from suffering severe attenuations otherwise experienced due to multiple reflections at the periphery of the conduit. Such focusing means may be a gas lens, or a plurality thereof, in the conduit. Thereby a gaseous waveguiding device is formed, which is especially useful wherever the pipeline undergoes a departure from a straight line. The focusing of the beam is obtained by establishing a radial refractive index gradient transversely across a cross section of the conduit; thereby a lens, or a plurality of lenses, is presented in effect to the optical beam itself.

Basically there are two types of such gaseous waveguiding devices. In one type the radial refractive index gradient is obtained by establishing a radial temperature gradient in the gas; in the other type two optically different gases, i.e., having different refractive indices, are physically introduced into the conduit in such a manner as to establish the radial refractive index gradient.

In the U.S. Pats. to D. W. Berreman, No. 3,355,235 issued on Nov. 28, 1967, No. 3,390,934 issued on July 2, 1968, and the copending applications by D. W. Berreman and S. E. Miller, Ser. No. 379,175, filed June 30, 1964, now U.S. Pat. No. 3,410,627; by A. C. Beck, G. E. Conklin and A. R. Hutson, Ser. No. 379,112, filed June 30, 1964, now U.S. Pat. No. 3,400,993; and by G. E. Conklin, Ser. No. 397,678, filed Sept. 21, 1964, now U.S. Pat. No. 3,410,628; all of which are assigned to applicants' assignee, there are described various types of gaseous lenses and gaseous transmission media particularly adapted for the transmission of optical wave energy.

However, such gas lenses may suffer from a gravity induced distortion or aberration caused by the fact that when the conduit is horizontal, or partly horizontal, gravity pulls the optic axis downward. In particular, in the case of the radial temperature gradient lens in a circularly cylindrical conduit, the optic axis may be displaced down from the central geometric axis of the cylinder by approximately one-fifth of the radius of the cylinder. In order to counteract and minimize this effect, it has been suggested that a lower portion of the cylinder wall be heated to a higher temperature than an upper portion thereof. The vertical temperature gradient thereby induced in the gas superposed on the radial temperature gradient tends to create an upward convection force to minimize the gravity-induced aberration described above. This is described, for example, in the U.S. Pat. application, E. A. J. Marcatili, Ser. No. 487,677 filed on Sept. 16, 1965, now U.S. Pat. No. 3,442,574, and having the same assignee as the present application.

However, while such nonuniform heating as described in Marcatili of the wall of the conduit cylinder will counteract the optical prism effect caused by the downward displacement of the optic axis, there will yet remain an optical aberration in the gas lens. This aberration is caused by the fact that the downward displacement due to gravity is greater along a vertical diameter of the cylinder than along an adjacent vertical chord parallel thereto.

Additionally, undesired and uncontrolled angular temperature gradients may be caused by heat loss from the heating elements to the surroundings.

SUMMARY OF THE INVENTION

To reduce optical aberration, according to this invention, a controllable heating distribution of the lower portion of the walls of the conduit is introduced to create a temperature distribution thereat which is different from the above-mentioned prior art. This heating of the lower portion of the lens is arranged to produce a novel nonuniform temperature distribution, that is, an angular gradient of temperature at a plurality of peripheral locations in the lower portion of the lens. More specifically, the conduit wall temperature at the bottom of a vertical diameter is made a maximum with respect to the wall temperature at the bottom of adjacent parallel vertical chords. Further, angular temperature gradients are controllably established at a plurality of peripheral locations in the lower portion of the gas lens, so that the temperature is still lower at the bottom of parallel vertical chords still farther away from the vertical diameter than the aforesaid adjacent vertical chords. Advantageously, the vertical projection of the cross section of the optical beam upon the lower portion of the conduit wall includes a plurality of said peripheral locations, so that the temperature gradients vertically beneath the beam itself can be controlled.

Likewise, minimization of gravity-induced optical aberration may be achieved, according to this invention by novel nonuniform heating of the conduit wall at the upper portion of the gas lens. The conduit wall temperature at the top of a vertical diameter is made a minimum with respect to the wall temperature at the top of adjacent vertical chords. Further, angular temperature gradients are controllably established at a plurality of peripheral locations in the upper portion of the gas lens, so that the temperature is still higher at the top of parallel vertical chords still farther away from the vertical diameter than the aforesaid adjacent vertical chords. Advantageously, the vertical projection of the cross section of the optical beam upon the upper portion of the conduit wall includes a plurality of said peripheral locations, so that the angular temperature gradients vertically above the beam itself can be controlled. This angular gradient heating of the upper portion of the conduit may be used as an alternative to the previously described angular gradient heating of the lower portion of the conduit, or in addition thereto.

In a specific embodiment of this invention, the novel temperature distributions are obtained by providing a plurality of electrical-current-carrying metal strips at the lower and upper portions of the conduit. Each of these strips is separately heated by an adjustable electric current, in order to establish and control the desired angular temperature gradients and to compensate for any undesired gradients caused by heat loss to the surroundings. Advantageously, the vertical projection of the cross section of the optical beam includes many of these strips, in order that the angular temperature gradients vertically above and below the optical beam itself may be controlled.

In another specific embodiment of this invention, the novel temperature distributions may be achieved by controllably tapering, in the angular sense of direction, the thickness of electrical-current-carrying metal heating strips. Thereby the desired angular temperature gradients are established.

BRIEF DESCRIPTION OF THE DRAWING

This invention may be better understood from the following detailed description in conjunction with the drawing, not to scale for purposes of clarity, in which:

FIG. 3 is a diagram, partly in cross section, of a gas lens in accordance with another specific embodiment of this invention;

FIG. 4 is a cross-sectional view of the gas lens shown in FIG. 3;

DETAILED DESCRIPTION

Figure 1:
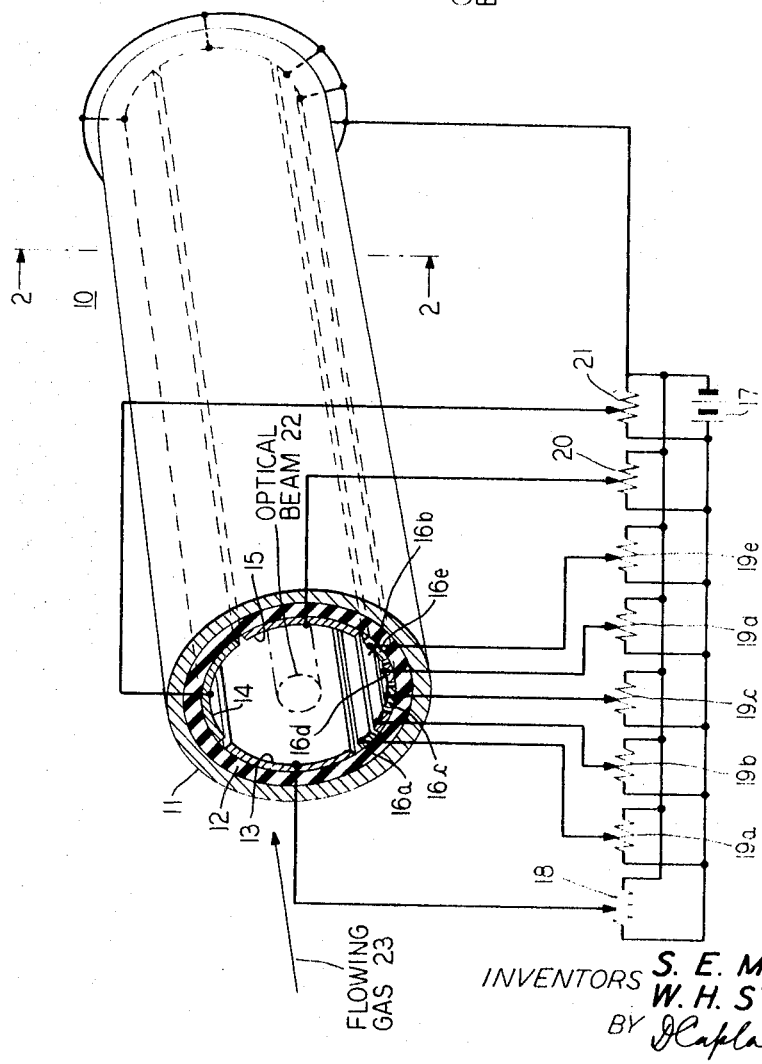
FIG. 1 is a diagram, partly in cross section of an optical beam transmission conduit forming a gas lens, in accordance with one specific embodiment of this invention.

Referring to the drawings, FIG. 1 is an illustrative embodiment of a gas lens conduit 10 for optical transmission according to this invention. The gas lens conduit 10 comprises typically an outer, circularly cylindrical, hollow tube 11. Inside this conduit 11 is an electrically and thermally insulating conduit layer 12. The insulating layer 12 itself is lined with electrical conducting, typically metal, strips 13, 14, and 15; each of with occupies slightly less than one-quarter of the periphery of the inside of the cylindrical layer 12. Strips 13, 14, and 15 run along the inside of the conduit layer 12 in a longitudinal direction (parallel to the optical beam). The strips 16a—e the remaining approximately one-quarter of the periphery, running along the inside of the conduit layer 12 in the lower portion of cross section of the conduit. Between each and every one of the metal strips 13, 14, 15 and 16a—e, typically an electrically and thermally insulating strip (not shown) lines the conduit layer 12; so as to present a smooth surface to the gas flowing in a direction which is parallel to the axis of the cylinder inside the conduit, and to enable efficient establishment and maintenance of temperature differences between adjacent metal strips.

Each of the strips 13, 14, 15, 16a—e is heated by means of electrical current from the electrical battery source 17 as controlled by the variable resistors 18, 19, 20 and 21a—e in potentiometer configurations, as shown in FIG. 1. Thus, the temperature of each of the strips 13, 14, 15, 16a—e along the wall of the conduit gas lens 10 may be separately controlled by adjustment of each of the resistors 18, 19, 20, 21*l*—e, respectively.

Although not clearly indicated on the drawing for purposes of clarity, it is advantageous to arrange the metal strips 16a—e so that the vertical projection of the cross section of the optical beam 22 upon these strips includes the spaces between said strips.

The optical beam 22, typically of substantially smaller diameter than the inside diameter of the conduit layer 12, is introduced into one end of the conduit 10; and said beam 22 is directed along the axis of the conduit 10 so that the beam 22 is transmitted along the central (paraxial) region thereof. The flowing gas 23, transparent to the frequency or frequencies of operation in the optical beam 22, is likewise introduced to flow longitudinally through the conduit 10.

Figure 2:
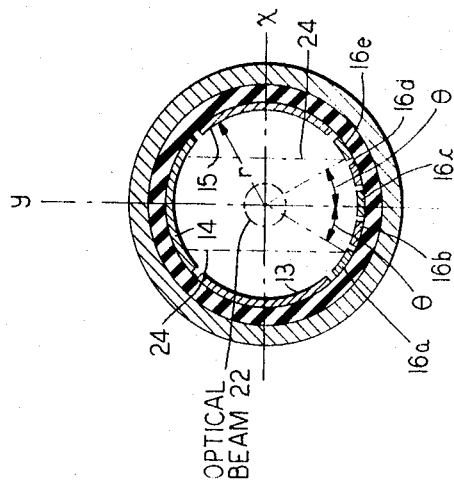
FIG. 2 is a cross-sectional view of the gas lens shown in FIG. 1.

The operation of the conduit 10 is explained with references to FIG. 2, a cross section view of the device shown in FIG. 1. As explained in the aforementioned U.S. Pat. application of Marcatili, the resulting temperature difference established in the gas flowing in the gas lens conduit 10 between central region and the peripheral region of the cross section of the conduit, i.e., the radial temperature gradient, controls the effective focal length of the gas lens. This focal length in turn controls the waveguiding confinement of the optical beam to the central region of the conduit 10. In addition, difference between strip 13 and strip 15 affords horizontal deflection capability of the optical beam, by reason of a prism effect in the horizontal X direction indicated in FIG. 2.

The difference between the temperature of the strip 14 and the average temperature of the strips 16a—e affords vertical deflection capability of the optical beam, by reason of a prism effect in the vertical Y direction. This temperature difference is useful for controllably counteracting the gravitationally induced tendency of the optical beam otherwise to be deflected downwards, caused by the tendency of the center of mass of the gas to sink below the geometric center, the origin of the XY coordinate system of FIG. 2. Because this tendency, for the optic axis to sink, increases with distance longitudinally along the axis of the conduit (i.e., in the direction of the optical beam 22), the strips 14 and 16a—e are tapered in this longitudinal direction. Specifically the strip 14 is thinner (radially measured) at the input end than at the output end of the conduit 10, whereas the strips 16a—e are thicker (radially measured) at the input end than at the output end of the conduit 10, as described in the aforementioned U.S. Pat. application of Marcatili.

However, the sinking of the $y$ coordinate $\bar{y}$ of the center of mass for each vertical chord of the gas, such as vertical chord 24, varies with the horizontal coordinate $x$ of the chord, and hence varies with angular coordinate $\Theta$, the angular distance measured in the sense of direction away from the bottom of the gas lens conduit 10 (where strip 16c is located). This variable sinking tendency is due to the fact that the vertical chords situated at larger horizontal distances from the origin are characterized by smaller temperature gradients, in the first approximation where all strips 13, 14, 15, 16a—e are at the same temperature. Thus, the desirable amount of counteraction of the sinking tendency is greatest at $\Theta=0$, and decreases with $\Theta$. Hence, advantageously the strip 16c is heated to a higher temperature than the adjacent strips 16b and 16d. Likewise, the strips 16b and 16d are heated to a higher temperature than strips 16a and 16e. Thereby an angular gradient of temperature in the gas lens is established in the lower portion of the conduit 10, where the strips 16a—e are located. More specifically, a temperature distribution thereat is established which is characterized by a maximum temperature at the very bottom ($\Theta=0$ and by a negative angular temperature gradient on both sides of the vertical diameter in the regions between the several strips 16a—e. Thereby, the gas flowing contiguous to these strips 16a—e is heated to a temperature distribution which is monotonically decreasing at the periphery of the gas adjacent the regions between these strips. Advantageously, the spaces between the strips 16a—e occupy a substantial fraction of the lower portion of the lens on both sides of the bottom thereof, in order to have a smooth angular temperature gradient vertically beneath the optical beam 22.

In any event, the temperatures of the strips 16a—e may all be varied until the optical beam 22 is observed to have a minimum aberration upon exiting the conduit. For still greater control, instead of having the five strips 16a—e shown in FIGS. 1 and 2, many more such strips may be used in the angular region originally covered by these strips 16a——It is advantageous to arrange these strips so that the vertical projection of the cross section of the optical beam 22 includes many of such strips. Thereby, the angular temperature gradients vertically beneath the optical beam 22 may be controlled.

FIGS. 3 and 4 show another illustrative embodiment of this invention. This embodiment is substantially the same as previously shown and described in connection with FIGS. 1 and 2, except for the strips 14a—e in the upper portion of the conduit 10 carrying currents controlled by resistors 21a—e, instead of strip 14 and resistor 21 along. Again, although not clearly indicated on the drawing for purpose of clarity, it should be understood that the vertical projection of the optical beam 22 upon these strips 14a—e includes the spaces between these strips.

In the embodiment shown in FIGS. 3 and 4 greater control over the gravity-induced optical aberration may be achieved than in the embodiment shown in FIGS. 1 and 2. More specifically by adjusting the resistors 21a—e, strip 14c is advantageously maintained at a lower temperature than the adjacent strips 14b and 14d, while strips 14b and 14d are maintained at a lower temperature than 14a and 14e. Thereby, angular temperature gradients are established in the regions between these strips 14a—e. These temperature gradients are positive as measured with respect to an angular sense of direction away from the top of the gas lens conduit 10 where strip 14c is located. These temperature gradients in the upper portion of the conduit 10 likewise tend to counteract the gravitationally induced optical aberration described above, either alone or in combination with the temperature gradients in the lower portion of the conduit 10 (produced by the temperature differences between the various strips 16a—e as described above in connection with FIGS. 1 and 2). In any event, all the strips 14a—e and 16a—e are maintained at temperatures, which minimize the observed aberration in the gas lens conduit 10.

Figure 6:
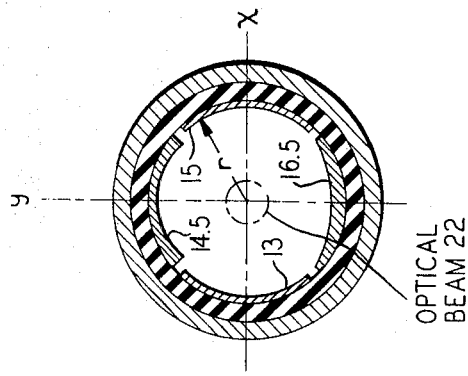
FIG. 6 is a cross-sectional view of the gas lens shown in FIG. 5.
Figure 5:
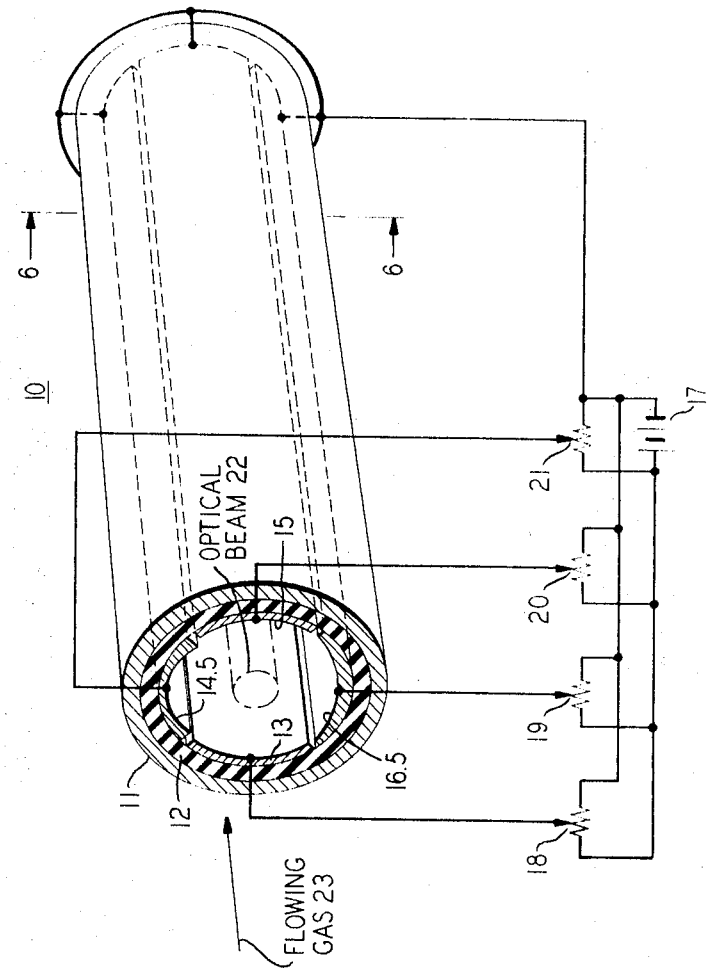
FIG. 5 is a diagram, partly in cross section, of a gas lens in accordance with yet another specific embodiment of this invention.

FIGS. 5 and 6 show another illustrative embodiment of this invention. The embodiment here achieves angular gradients of temperature to counteract the gravity-induced aberration by smoothly tapering the thickness of the electrically conductive strips 14.5 and 16.5. The tapering is in the angular sense of direction along the cross section of the gas lens 10. Thereby, the angular gradients of temperature established by the electrical currents flowing therein are more smoothly varying in the angular sense of direction.

In particular, the strip 14.5 has minimum thickness at the very top of the gas lens conduit 10 and tapers to a larger thickness in the angular sense of direction away from this top location. Thereby the electrical resistance per unit length of the strip 14.5 is a maximum at the very top of the conduit 10, and tapers to a lower value at increasing angular distance therefrom. Hence, the joule heating ($V^2/R$) of this strip 14.5 will be such as to result in a minimum temperature at this very top location with respect to the adjacent portions of this very same strip 14.5. Likewise, because of this taper's effect upon electrical resistance the joule heating of this strip 14.5 will produce, at all angular locations thereof, where this taper exists, an angular temperature gradient which is negative as measured with respect to an angular sense of direction away from the top of the conduit 10.

The strip 16.5, on the other hand, has a maximum thickness at the very bottom of the gas lens conduit 10, and tapers to a smaller thickness in the angular sense of direction away from this bottom location. Thereby, the electrical resistance per unit length of the strip 16.5 is a minimum at the very bottom thereof, and tapers to higher values with increasing angular distance therefrom. Hence, the joule heating of this trip 16.5 will be such as to result in a maximum temperature at this very bottom location with respect to adjacent portions of this very same strip 16.5. Likewise, because of this taper's effect upon electrical resistance, the joule heating of this strip 16.5 will produce, at all angular locations thereof where this taper exists, an angular temperature gradient which is positive with respect to an angular sense of direction away from the bottom of the conduit 10.

It is obvious that the embodiments shown in FIGS. 1—4 are easier to adjust to minimize the gravity-induced aberrations, merely by adjusting the various resistors 19a—e and 21a—e and observing the optical beam. Once an optimum temperature distribution at the periphery of the gas lens has thereby been found, the strips 14.5 and 16.5 for the embodiment shown in FIGS. 5 and 6 may be specified and built. Even subsequently to building these strips 14.5 and 16.5, further adjustment of the tapering of their thickness may be made by selectively adding or removing electrically conductive material. Advantageously, the electrically conductive material used in strips 14.5 and 16.5 is somewhat thermally insulating in order to support the desired temperature gradients.

As an alternative to tapering the thickness of the bottom and top strips in the gas lens 10, as previously indicated by the strips 14.5 and 16.5 in FIGS. 5 and 6, the electrical resistance of these strips may be varied by means of utilizing electrically nonhomogeneous material in the angular sense of direction. Thereby the electrical resistance per unit length will vary in said sense of direction, and thus there will be established the desired temperature gradients.

Although this invention has been described in terms of specific embodiments, it should be obvious to those skilled in the art that various modifications may be made within the scope of this invention. For example, the above-described angular gradient type of heating at a plurality of locations may be used in gas lenses in which the radial gradient of refractive index is obtained by means other than by establishing a radial gradient of temperature, such as by establishing a radial gradient of pressure or by using two different kinds of gases.

What I claim is:

1. In the transmission of an optical beam along the central region in a gas lens having a radial gradient of refractive index in a horizontal or partly horizontal conduit, the improvement which comprises heating the lower portion of the conduit to a temperature distribution which has negative angular gradients in the said lower portion at a plurality of locations on at least one side of the bottom of the cross section of the conduit, said angular temperature gradients being measured with respect to the sense of angular direction away from the bottom of the conduit and relative to an origin which is located within said central region, the vertical projection of the cross section of the optical beam including a second plurality of said locations.

2. In a gas lens optical transmission system having a radial gradient of refractive index of gas flowing along the central region in a horizontal or partly horizontal conduit, the improvement which comprises means for controllably establishing angular temperature gradients in the lower portion of the conduit at a first plurality of locations thereat, said angular gradients being measured with respect to the sense of angular direction away from the bottom of the conduit and relative to an origin which is located within said central region.

3. The system set forth in claim 2 in which the radial gradient of refractive index is produced by a radial gradient of temperature of the gas.

4. The system set forth in claim 2 in which the angular temperature gradient is negative with respect to the angular sense of direction away from the bottom of the conduit.

5. The system set forth in claim 4 in which said means comprise an electrically conductive strip running along the inside of the lower portion of the conduit in a direction which is parallel to the flow of gas in the conduit, the electrical resistance per unit length of said strip being a minimum at the bottom of the conduit, and said electrical resistance tapering to higher values than said minimum with increasing angular distance from said bottom of the conduit.

6. The system set forth in claim 5 in which said means further comprise means for separately adjusting the electrical current in each strip in order to adjust the temperature thereof.

7. The system set forth in claim 2 in which said means comprise a second plurality of electrically conductive strips running along the inside of the lower portion of the conduit in a direction parallel to the flow of gas in the conduit.

8. In a gas lens optical transmission system having a radial gradient of refractive index of gas flowing along the central region in an at least partly horizontal conduit, means for establishing angular temperature gradients in the upper portion of the conduit at a first plurality of locations thereat, said angular temperature gradients being measured with respect to the sense of angular direction away from the top of the conduit with respect to an origin which is located within said central region.

9. The system of claim 8 in which the said means include a second plurality of electrically conductive strips running along the inside of the upper portion of the conduit in a direction which is parallel to the flow of gas in the conduit.

10. The system of claim 9 in which said means further include means for separately adjusting the electrical current in each strip in order to adjust the temperature thereof.

11. The system of claim 9 in which the said means comprise an electrically conductive strip running along the inside of the upper portions of the conduit in a direction which is parallel to the flow of gas in the conduit, the electrical resistance per unit length of said strip being a maximum at the top of the conduit, said electrical resistance tapering to lower value than said maximum with increasing angular distance from said top of the conduit.